(12) United States Patent
Herrera et al.

(10) Patent No.: US 12,462,066 B2
(45) Date of Patent: Nov. 4, 2025

(54) NETWORK DEVICE AGENTLESS VALIDATION

(71) Applicant: AT&T Intellectual Property I, L.P., Atlanta, GA (US)

(72) Inventors: Gregory Herrera, Sea Girt, NJ (US); Robert Kong, Tinton Falls, NJ (US); Emily Lu, Morganville, NJ (US); Brittany Vassallo, Howell, NJ (US); Meredith Gee, Atlantic Highlands, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 375 days.

(21) Appl. No.: 18/092,171

(22) Filed: Dec. 30, 2022

(65) Prior Publication Data

US 2024/0220658 A1 Jul. 4, 2024

(51) Int. Cl.
*H04L 29/06* (2006.01)
*G06F 16/11* (2019.01)
*G06F 21/64* (2013.01)

(52) U.S. Cl.
CPC ............ *G06F 21/64* (2013.01); *G06F 16/128* (2019.01); *G06F 2201/84* (2013.01)

(58) Field of Classification Search
CPC .......... G06F 21/50; G06F 21/51; G06F 21/52; G06F 21/55; G06F 21/56; G06F 21/57; G06F 21/64; G06F 16/128; G06F 2201/84; H04L 63/12; H04L 63/14; H04L 63/1408
See application file for complete search history.

(56) References Cited

U.S. PATENT DOCUMENTS

| | | | |
|---|---|---|---|
| 8,312,548 B1 * | 11/2012 | Cnudde | G06F 21/56 707/610 |
| 12,061,693 B2 * | 8/2024 | Piatt | G06F 21/554 |
| 2023/0088422 A1 * | 3/2023 | Mintz | G06F 21/72 726/34 |
| 2023/0205636 A1 * | 6/2023 | Yadav | G06F 11/1456 707/640 |

OTHER PUBLICATIONS

Cis Benchmark, "A Guide to Defining Reasonable Cybersecurity", Center for Internet Security, printed on Jun. 7, 2024; pp. (10). https://www.cisecurity.org/cis-benchmarks.
(Continued)

*Primary Examiner* — Malcolm Cribbs

(57) ABSTRACT

A processing system may obtain baseline attributes associated with a plurality of representative files of a first type of network equipment, where the baseline attributes comprise a plurality of baseline checksums associated with the plurality of representative files, obtain snapshot attributes associated with a first plurality of files of a first device deployed in a communication network, where the first device is of the first type of network equipment, and where the first plurality of files is associated with at least a portion of the plurality of representative files, identify at least one file of the first plurality of files or at least one directory associated with the first plurality of files, for which a respective one of the snapshot attributes fails to match a respective one of the baseline attributes, and perform at least one remedial action in the communication network in response to the identifying.

20 Claims, 3 Drawing Sheets

(56) References Cited

OTHER PUBLICATIONS

E. Lear, S. Rose, "Discovering and Retrieving Software Transparency and Vulnerability Information", Cisco Systems, NIST, Network Working Group; published on Oct. 10, 2022, pp. (23). https://datatracker.ietf.org/doc/draft-ietf-opsawg-sbom-access/12/.
NTIA Multistakeholder Process on Software Component Transparency Framing Working Group, "Software Identification Challenges and Guidance", published on Mar. 30, 2021; pp. (10). https://www.ntia.gov/filesntiapublications/ntia_sbom_software_identity-2021mar30.pdf.
NTIA Multistakeholder Process on Software Component Transparency, "SBOM at a Glance", printed on Jun. 7, 2024; pp. (3). https://www.ntia.gov/sites/default/files/publications/sbom_at_a_glance_apr2021_0.pdf.
National Telecommunications and Information Administration, "Software Bill of Materials", United States Department of Commerce, printed on Jun. 7, 2024; pp. (6). https://www.ntia.gov/page/software-bill-materials.
International Standard, "Information technology—SPDX® Specification V2.2.1", ISO/IEC 5962, First edition Aug. 2021, printed on Jun. 7, 2024; pp. (160). https://spdx.dev/use/specifications/.

* cited by examiner

NETWORK DEVICE AGENTLESS VALIDATION

The present disclosure relates generally to communication network security and operations, and more particularly to apparatuses, computer-readable media, and methods for performing at least one remedial action in a communication network in response to identifying at least one file or at least one directory for which a respective snapshot attribute fails to match a respective one of a plurality of baseline attributes associated with a plurality of representative files.

BACKGROUND

Probing and troubleshooting in communication networks are currently monolithic, inflexible, and closed. A network service provider may invest in building a parallel passive probe infrastructure to monitor network functions, yet current infrastructure does not scale well. Current probe infrastructure may consume a significant fraction of cellular core network resources (e.g., up to 30 percent or more for virtualized networks). In addition, with next generation networks entering deployment, the amount of network data on control plane is anticipated to increase tenfold. However only a fraction of such data may ever be used by network operations personnel or automated systems. Furthermore, it may be beneficial to monitor the network traffic in real time, but real time monitoring further increases the complexity and computational cost for the network service provider.

SUMMARY

Apparatuses, computer-readable media, and methods for performing at least one remedial action in a communication network in response to identifying at least one file or at least one directory for which a respective snapshot attribute fails to match a respective one of a plurality of baseline attributes associated with a plurality of representative files are described. For instance, a processing system including at least one processor may obtain a plurality of baseline attributes associated with a plurality of representative files of a first type of network equipment, where the plurality of baseline attributes comprises a plurality of baseline checksums associated with the plurality of representative files, and obtain snapshot attributes associated with a first plurality of files of a first device deployed in a communication network, where the first device is of the first type of network equipment, and where the first plurality of files is associated with at least a portion of the plurality of representative files. The processing system may next identify at least one of: at least one file of the first plurality of files or at least one directory associated with the first plurality of files, for which a respective one of the snapshot attributes fails to match a respective one of the plurality of baseline attributes. The processing system may then perform at least one remedial action in the communication network in response to the identifying of the at least one of the at least one file or the at least one directory for which the respective one of the snapshot attributes fails to match the respective one of the plurality of baseline attributes.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
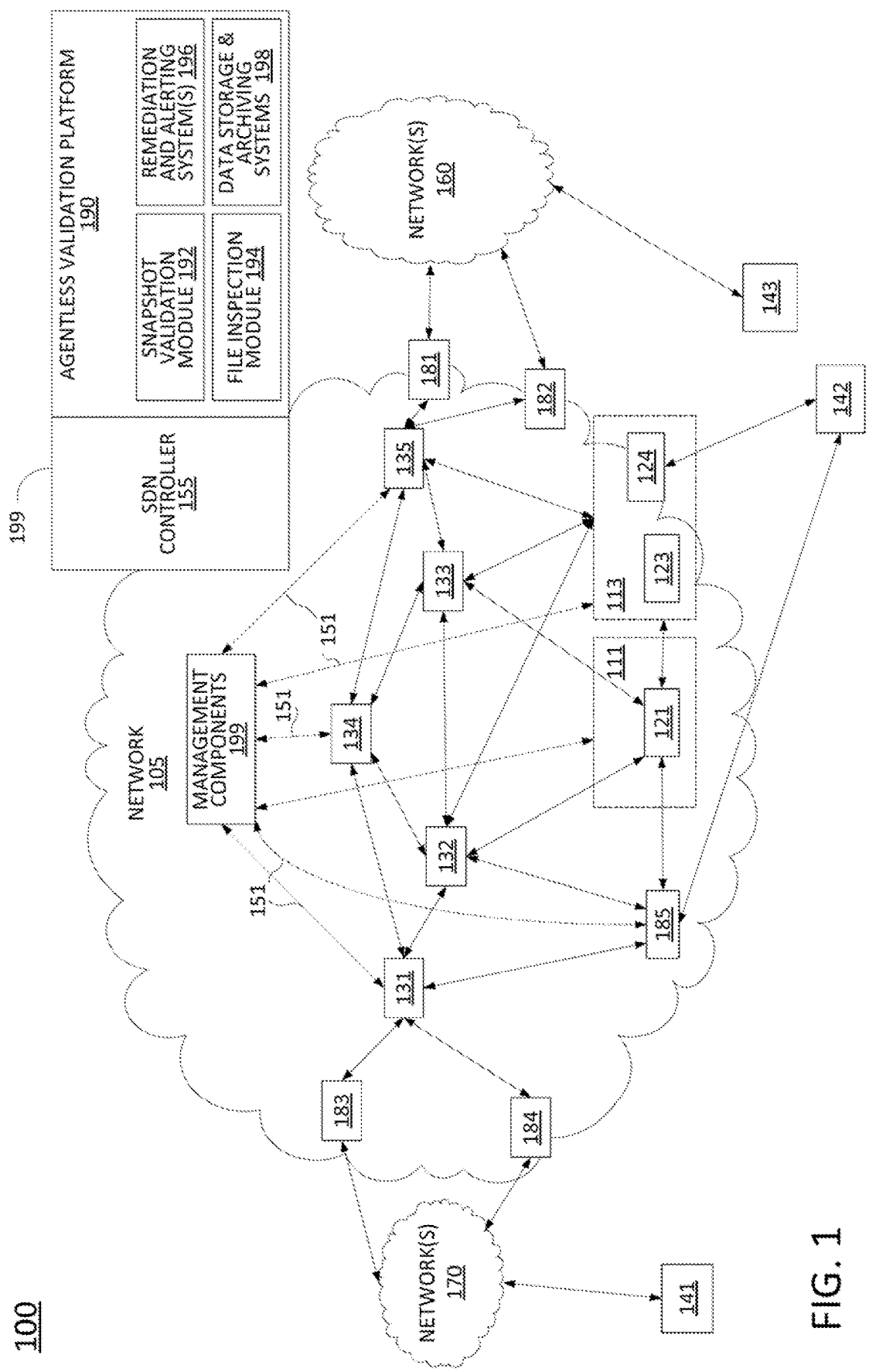
FIG. 1 illustrates an example system related to the present disclosure.

This present disclosure describes methods, computer-readable media, and apparatuses for performing at least one remedial action in a communication network in response to identifying at least one file or at least one directory for which a respective snapshot attribute fails to match a respective one of a plurality of baseline attributes associated with a plurality of representative files. To illustrate, in a large communication network environment, a network operator may verify the security posture of network devices using third party agents and applications, such as anti-virus software. However, these agents and/or applications may negatively impact the performance and operation of the device, and may further add time and cost for testing and certification as new operating systems and third party software versions are rolled out. In addition, network architectures are moving from dedicated devices to disaggregated hardware and software designs. Nevertheless, network operating system (NOS) vendors may hesitate to allow third party agents to be deployed in conjunction with their NOS packages. Thus, impacts such as unsupported operating systems, performance issues, security vulnerabilities, and testing overhead are just some of the issues that a third-party agent can introduce. The present disclosure describes examples of agentless validation, in which a network operator may verify and attest to the security posture of network zones and the devices therein by collecting and analyzing file and directory attributes, which may include checksums, permissions, ownership, file type, etc., for each file that exists on each device in a non-agent, lightweight manner. Representative functions of an agentless validation platform, or system include collection/ingestion, analysis, inventory and reporting/alerting.

Notably, rather than utilizing traditional dedicated appliances for routers, Ethernet switches, etc., examples of the present disclosure address a communication network that may utilize a selection of white boxes, network devices with disaggregate hardware and software. In accordance with the present disclosure, a white box may comprise compact packet routing hardware that has been designed for the network operator specifications and provided by a hardware vendor. In one example, to make a larger router, white boxes can be configured as a cluster. In one example, there may be subsets of white box hardware designs, each design capable of meeting the specifications for various service needs. In one example, the communication network may comprise an edge-core architecture which use core- and edge-type white boxes, respectively. In addition, in one example, white boxes may also include "feeder" devices, such as modular access multiplexers (EMUXs) and optical line terminations (OLTs).

In one example, the present disclosure includes data collection to capture network device information and inventory data, which may be stored in a database for use in connection with agentless validation. Network device information may include device identifier(s), baseline files, snapshots, hardware version, software version(s), indicators of whether vulnerable software versions is/are installed, etc. In one example, network device vendors are tasked with providing a baseline of file data for each network device (or for each network device type) and for each release, patch, etc. In one example, the network operator may receive this data as a software bill of materials (SBOM). In one example, the SBOM may be in a software package data exchange (SPDX) format. In addition, in one example, each network device, e.g., the network operating system (NOS) thereof, is tasked with having built-in/native capabilities to collect file and directory information during runtime (e.g., "snapshots"). For instance a snapshot may record current attributes for the files and/or directories on a network device. The snapshot may have collection integrity requirements (e.g., digitally signed, limited accessibility via protected execution, etc.).

In one example, the agentless validation platform may securely collect baselines from device/NOS vendors and snapshots from various network devices, and may generate reports, exceptions, or the like (e.g., identifying network devices with improper configurations, old software versions, etc.), may generate instructions to reconfigure the communication network (e.g., to reroute traffic to avoid an affected network device, etc.), and so forth. For instance, the agentless validation platform may detect and report anomalies for: NOS baseline integrity (e.g., verify runtime NOS against vendor-supplied baseline(s)), network operator and/or Center for Internet Security (CIS) benchmark compliance validation (e.g., file permissions and ownership compliance verifications, device security configuration verification, running services, etc.), vulnerable software (e.g., detection for instances of vulnerable software and/or outdated patches, missing and/or additional software, etc.), software patches/updates (e.g., there should be very few file differences between similar devices, therefore if a few devices fall out of step with the rest of the devices in their group, the agentless validation platform may identify if any devices are missing required software patches), and so forth.

In one example, the present disclosure may utilize several sets of baseline attributes. For instance, a first set of baseline attributes may be referred to as a "gold" baseline, which may comprise an initial baseline that is received from a vendor. In one example, this baseline is considered as an authoritative source that is only verified for syntax, and may be stored as an initial record. Next is a "sliver" baseline, which may be received once a device is initially configured for deployment in the communication network (e.g., a representative network device of a network device type). In one example, this baseline may be compared against the gold baseline and checked for network operator and CIS benchmark compliance. In one example, this is the main baseline that may be used for network device baseline comparison, e.g., integrity and security verification. Lastly, is a "bronze" baseline, which may be recorded after another valid device configuration is defined post-deployment. For instance, the bronze baseline may be different from the sliver baseline in that it does not have the same configuration values. However, once it is validated, it is considered another valid configuration baseline. There can be multiple bronze baselines to compare against. It should be noted that the bronze baseline(s) will be unique per device.

To further illustrate, snapshots of a network device (e.g., sets of file and/or directory attributes collected by the network device, which may be referred to as "snapshot attribute") may be obtained by the agentless validation platform and verified against the one or more baselines. For instance, the agentless validation platform may look at several file properties, such as the file checksum. For properly configured and secure network devices, immutability is expected. Thus, for example, most files on a network device being monitored should remain unchanged. If a checksum from a snapshot is not included in a baseline, the agentless validation platform may immediately identify that these file contents are new/modified and may generate an alert, may request a copy of the affected file(s) from the network device for further verification, and so forth. Notably, there are very few differences in files between like systems. For instance, in an empirical sampling, it has been found that only 0.06% of files across different network devices (of a same network device type) were unique. Accordingly, in one example, if a snapshot contains file checksums that vastly differ from those of other network devices of a same type, the agentless validation platform may identify that the particular network device has fallen out of step and may need to be patched.

In summary, the agentless validation platform may analyze baselines and snapshot collections to gain a view of the overall security posture of a network device. In addition, the agentless validation platform may examine file and directory attributes for mismatches between network devices of a same type. The agentless validation platform may additionally collect inventory attributes of software packages with known vulnerabilities, which may be referenced for further baseline and snapshot analyses to detect if known vulnerable software packages are installed on a network device. In addition, the agentless validation platform may generate reports identifying network devices that are affected by vulnerable versions, which devices are missing software patches, which devices appear to have modified files or directories, etc. The agentless validation platform may also report whether network devices pass or fail checks for overall compliance with network operator security requirements, CIS security requirements, or the like. Moreover, in one example, the present disclosure may further collect metrics on the performance of the agentless system itself, such as the number of network devices analyzed, the detected number of network devices with vulnerabilities, common vulnerability findings across network devices, the severity of detected network vulnerabilities, and so forth.

In accordance with the present disclosure, the NOS vendor is given requirements for collecting and transferring SBOM data to be included in each software delivery/update/patch, and similar runtime reporting requirements. In one example this SBOM is delivered in SPDX format. In one example, the SPDX may list all the open source software used in the NOS, including the name of the package, a checksum, license information, where the package can be downloaded from, etc., and may be stored in an agentless database for ongoing use. In addition, the NOS vendor may be given requirements to provide a "gold baseline" from each software delivery/update/patch. To further illustrate, the gold baseline may comprise a structured file with key characteristics associated with the files and directories contained in the NOS, including checksums, permissions, ownership, etc. The gold baseline may also include an additional block of information that describes other security aspects of the device, e.g., ports that are permitted for use or the like.

This block of information may be utilized and compared against a corresponding block provided in the snapshot collections in a future phase.

After the NOS vendor has provided the above gold baseline, various network devices may be configured and a silver baseline may be generated with the new configured values that may be verified against appropriate compliance requirements and the gold baseline. For instance, the network operator may configure the software on the white box with site-specific configuration settings. After such configuration, the files and directories of the white box may be considered to be in a stable state, with attributes that can then be used to generate a silver baseline. The silver baseline may then be used as the standard for subsequent comparisons. Once a network device (e.g., a "white box" (WB) with disaggregated hardware and software, and with an NOS installed) is configured and running in production, the NOS may comply with additional requirements for periodic and on-demand reporting of the files and directories currently on the network device. These "snapshots" reports may be sent to and received by the agentless validation platform, which may compare the "snapshot" against the appropriate baseline(s). It should be noted that in one example, the baselines and snapshot reporting may exclude basic input output system (BIOS), open network install environment (ONIE), or other firmware on the white box. In one example, the present disclosure may consider two umbrella categories of data that may be collected: data that is checkable by file integrity manager (FIM) (e.g., file and directory properties) and non-FIM checkable data (e.g., running processes, open ports, and other data not included in the former category).

As noted above, data collection specifications may be provided to a network device and/or NOS vendor such that functionality is built into the NOS to collect the specified data (e.g., snapshot attributes). For instance, in one example, a specification for a gold baseline may indicate all or a portion of the following is to be collected for each file that is part of the NOS: (a) file name, including the full path to the file (e.g., /usr/bin/bash), (b) file classification, (c) date timestamp, (d) file ownership and group ownership, (e) file permissions, (f) version and/or release identifier, (g) checksum for file, e.g., using SHA256, SHA512, or the like. Similarly, an example specification for the gold baseline may indicate all or a portion of the following is to be collected for each directory that is part of the NOS: (a) directory name, including the full path to the directory, (b) directory ownership and group ownership, and (c) directory permissions. In one example, for each file, the gold baseline may also include a file classification, e.g., one of: binary (e.g., executable file, libraries, etc.), configuration (e.g., password, router configuration file, etc.), or volatile (e.g., log files, temp files, etc.). In one example, for each code release, patch, etc. the device and/or NOS vendor may be tasked to supply a new gold baseline. In one example, the vendor may also be tasked (for an original and all subsequent versions) to provide a list of all ports used by software on the device, a list of possible listening network ports (e.g., HTTP, HTTPS, etc.), and/or a list of possible process names.

As noted above, the gold baseline may be provided to a network operator and may be contained in one file or a set of multiple files. In one example, the gold baseline may be in human readable format, and one that is easily parsed (e.g., extensible markup language (XML) or java script object notation (JSON), or the like). In one example, a different gold baseline may be used for each component of a network device that contains multiple components with different network operating systems. In one example, a different gold baseline may be used for different network operating systems that may be used on different hardware platforms (e.g., X85 or risc). In other words, each combination of hardware and NOS/software may have a different gold baseline for the NOS/software.

In one example, a snapshot collection may contain all the same file and directory properties provided in the baseline collections. These snapshot collections are compared against the silver and bronze baselines to gain a view of the overall security posture of the device. If a snapshot collection does not match the designated baselines, the differences are recorded for alerting, investigation, and remediation, such as updating/patching the device, marking the change as valid, disabling the network device or rerouting traffic away from the network device, etc. It should be noted that once a change is marked as valid, the designated baseline may be updated to also contain this new valid value (or a new additional baseline may be added). To further illustrate, with respect to snapshot attribute collection and reporting, a vendor NOS may be configured to generate snapshot reports meeting specifications similar to the gold baseline described above (and for all components that comprise the network device, if the network device contains multiple components). In one example, the snapshot collection is generated in the same way as the baseline. For instance, if the file checksums in the gold baseline are generated using SHA-256, the file checksums in the snapshot should also be generated using SHA-256. In one example, the snapshot attribute collection and report functions of the network device NOS are to be made available to be executed on-demand, e.g., via one or more defined application programming interfaces (APIs). Alternatively, or in addition, the snapshot attribute collection and reporting functions may be capable of being scheduled (e.g., executed daily, weekly, monthly, etc.) to generate and/or to transmit a snapshot report. In one example the on-demand or scheduled snapshot report generation may be for selected files, directories, and/or components (if the device contains multiple components) that may be specified by the network operator and/or other automated systems of the communication network (e.g., the agentless validation platform). In addition, in one example, the NOS may be configured to store snapshot reports locally, e.g., for reporting/transmission on demand or at a scheduled time. In one example, multiple reports may be stored for a time until offloaded or discarded.

A snapshot report may be digitally signed to protect the integrity of the contents, and date/time stamped. In one example, snapshot reports may be human-readable, but access may be limited to a privileged user. In addition, to ensure the integrity of snapshot collections, NOS processes used to generate the snapshot report should be protected (e.g., these processes should execute in accordance with the principles of least privilege, etc.). In addition, it is expected that programs are statically compiled, shared libraries are not used, and that before a report is generated, the NOS processes used to generate the report are validated to ensure that they have not been tampered with or modified. In one example, the NOS API(s) may also enable retrieval of copies of specific files listed as part of the snapshot from the network device (e.g., scp, ftp, Netconf, gRPC, etc.) (or any file, regardless of whether included in a current snapshot report). This can be used for compliance factors that rely on file content analysis to ensure compliance. An example of this type of requirement is "Verify that no passwords are in/etc/password." This can be checked by ensuring that the password values are set to "x" in that file, which may only be checked via file contents. Once the file contents are validated, the checksum of that file can be added to the designated baseline(s) (or a new baseline, e.g., a bronze baseline) as a valid checksum value that can be used for further comparisons. In one example, volatile files (such as log files, temporary files, etc.) may be exempt and need not be collected. However, in another example, any and all files may be accessible from the network device. In one example, the NOS API(s) may further provide for the collection and reporting of additional non-FIM aspects of the network device (e.g., listening service/network ports, running processes, logged in accounts, etc.).

In one example, validated and identified silver and bronze baselines may be compared against snapshot collections. As the agentless validation platform receives snapshot collections, it may compare the file and directory attributes/properties provided in the snapshot collection to those in the baselines. As a first pass, the agentless validation platform may compare the checksums in the snapshot collection to those in the designated baselines, and any that do not match are identified and reported as unknown files on the network device. The agentless validation platform may then look for common file names between the snapshot collection and baseline(s), and verify that any additional file properties match (and/or report any differences that are detected). For example, a file name that is found in the snapshot collection and the silver baseline, but which has different permissions may be flagged and reported. Once these differences are identified, one or more remedial actions may then be implemented in the communication network. For instance, if a file that does not match the corresponding baseline is identified as a "configuration" file, or another file that is "non-volatile" (e.g., expected to change infrequently or not at all), the file may be retrieved from the network element for further analysis (e.g., via one or more additional automated systems). If the file is found to be valid, the bassline(s) may be updated as mentioned above. In one example, for any file not deemed valid, additional actions may be taken, such as disabling the network element, reinstalling the NOS with a new/clean version, etc.

In one example, the agentless validation platform may report whether configured network devices pass or fail checks to determine overall device compliance. This validation can be performed with many of the file properties already gathered in the above-mentioned silver/bronze baselines and snapshot collections, while others may involve validating file contents. In types of compliance checks that cannot be completed with file properties gathered above, the files may be copied from the device and their contents inspected either manually or as part of an automated analysis. Once the file contents have been validated, the file checksum can be added to the bronze baselines and used for later analyses. If the checksum of a validated file changes, this process may be completed again, and either the baselines may be updated again, or additional issues may be identified and resolved. Lastly, checks that are not addressed via file property or file content validation may involve the vendor providing additional data to be analyzed, such as a list of listening ports. For instance, the command "netstat-tulpn|grep LISTEN" may be run, and the output checked against a list of listening ports, e.g., provided in the vendor's gold standard.

In addition to the foregoing, the agentless validation platform may determine if known vulnerable software packages are installed on a network device. For instance, the agentless validation platform may inventory the file properties of the vulnerable packages, which may be referenced for further baseline and snapshot analyses. In particular, when a new vulnerable software package version is identified, stored baselines and incoming snapshot collections may be analyzed for checksums that match those vulnerable versions. Reports may then be generated identifying the network devices that are affected by these vulnerable versions. Similarly, the agentless platform may further track, report, and/or remediate file and/or directory differences between network devices of a same type. For instance, the agentless validation platform may identify if any network devices are out of step with their peers. The agentless validation platform may also identify files and/or directories that appear to match old/prior version(s) of one or more software packages (e.g., when the file and/or directory checksums do not match to the current designated baseline(s), but are a match for an old baseline).

Examples of the present disclosure thus obviate the use of third-party agents on network device. In addition, network device performance is improved with collection functionality built into the NOS. In addition, the agentless validation platform may verify the integrity of software on network devices, may identify vulnerable software components (e.g., critical vulnerabilities (CVEs) on open source software modules), and may ensure that the network operator's security policies and requirements are met during design/development and operation of new and existing network devices. Various types of checks, such as proper file permissions, existence of vulnerable software, patch levels, and detection of certain types of malware on the appliance can be accomplished. All of these checks ensure that integrity of the appliance is maintained. This is possible due to the agentless validation platform's limited scope. Unlike general purpose systems where multiple services are supported, network appliances provide single services, or a narrow set of services. Differences between appliances of the same type, make, and model are minimal. With the exception of volatile files (e.g., log files, temporary files, etc.), the majority of the files are identical across network devices of a same type. For instance, less than 10 percent of all files may exhibit differences across network devices of a same type. From among these, less than one tenth of one percent may be unique files, with the rest comprising volatile files. The fact that network devices of a same type are nearly identical to one another provides the ability for the agentless validation platform to ensure the integrity of the network devices, detect unauthorized changes, report on vulnerable software, and to verify the security posture of the network devices, with minimal impact on the performance of network devices and the traffic of the communication network. These and other aspects of the present disclosure are described in greater detail below in connection with the examples of FIGS. 1-3.

To aid in understanding the present disclosure, FIG. 1 illustrates a block diagram depicting one example of a communication network or system 100 for performing or enabling the steps, functions, operations, and/or features described herein. The system 100 may include any number of interconnected networks which may use the same or different communication technologies. As illustrated in FIG. 1, system 100 may include a network 105, e.g., a core communication network. In one example, the network 105 may comprise a backbone network, or transport network, such as an Internet Protocol (IP)/multi-protocol label switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may alternatively or additional comprise components of a cellular core network, such as a Public Land Mobile Network (PLMN), a General Packet Radio Service (GPRS) core network, and/or an evolved packet core (EPC) network, a 5G core network, an Internet Protocol Multimedia Subsystem (IMS) network, a Voice over Internet Protocol (VoIP) network, and so forth. In one example, the network 105 uses a network function virtualization infrastructure (NFVI), e.g., servers in a data center or data centers that are available as host devices to host virtual machines (VMs) and/or containers comprising virtual network functions (VNFs). In other words, at least a portion of the network 105 may incorporate software-defined network (SDN) components.

It should also be noted that in accordance with the present disclosure, the term "virtual network function" (or "VNF"), may refer to both virtual machine (VM)-based VNFs, e.g., VNFs deployed as VMs, and containerized or container-based (VNFs), e.g., VNFs deployed as containers, such as within a Kubernetes infrastructure, or the like, also referred to as "cloud-native network functions" (CNFs). In one example, the present disclosure incorporates open standard formats/application programming interfaces (APIs) for requesting and obtaining snapshot reports, individual files, etc. This includes exports in uniform protocols/formats, which are vendor and platform agnostic. In addition, it should be noted that as referred to herein, "traffic" may comprise all or a portion of a transmission, e.g., a sequence or flow, comprising one or more packets, segments, datagrams, frames, cells, PDUs, service data units, bursts, and so forth. The particular terminology or types of data units involved may vary depending upon the underlying network technology. Thus, the term "traffic" is intended to refer to any quantity of data to be sent from a source to a destination through one or more networks.

In one example, the network 105 may be in communication with networks 160 and networks 170. Networks 160 and 170 may each comprise a wireless network (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, a peer network, and the like. In one example, the networks 160 and 170 may include different types of networks. In another example, the networks 160 and 170 may be the same type of network. The networks 160 and 170 may be controlled or operated by a same entity as that of network 105 or may be controlled or operated by one or more different entities. In one example, the networks 160 and 170 may comprise separate domains, e.g., separate routing domains as compared to the network 105. In one example, networks 160 and/or networks 170 may represent the Internet in general.

In one particular example, networks 160 and 170 may comprise 5G radio access networks. For example, as illustrated in FIG. 1, the system 100 may represent a "non-stand alone" (NSA) mode architecture where 5G radio access network components, such as a "new radio" (NR), "gNodeB" (or "gNB"), and so forth are supported by a 4G/LTE core network (e.g., where network 105 represents an Evolved Packet Core (EPC) network). However, in another example, system 100 may instead comprise a 5G "standalone" (SA) mode point-to-point or service-based architecture where EPC components and functions of network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. In addition, these various components may comprise VNFs, as described herein.

In one example, network 105 may transport traffic to and from endpoint devices 141-143. For instance, the traffic may relate to communications such as voice telephone calls, video and other multimedia, text messaging, emails, and so forth among the endpoint devices 141-143, or between the endpoint devices 141-143 and other devices that may be accessible via networks 160 and 170. Endpoint devices 141-143 may comprise, for example, cellular telephones, smart phones, personal computers, other wireless and wired computing devices, private branch exchanges, customer edge (CE) routers, media terminal adapters, cable boxes, home gateways and/or routers, and so forth.

In accordance with the present disclosure, endpoint devices 141-143 may communicate with or may communicate via network 105 in various ways. For example, endpoint device 141 may comprise a cellular telephone which may connect to network 105 via network 170, e.g., a cellular access network. For instance, such an example network 170 may include one or more cell sites, e.g., comprising, a base transceiver station (BTS), a NodeB, an evolved NodeB (eNodeB), or the like (broadly a "base station"), a remote radio head (RRH) and baseband unit, a base station controller (BSC) or radio network controller (RNC), and so forth. In addition, in such an example, components 183 and 184 in network 105 may comprise a serving gateway (SGW), a mobility management entity (MME), or the like. In one example, endpoint device 142 may comprise a customer edge (CE) router which may provide access to network 105 for additional endpoint devices (not shown) which may be connected to the CE router. For instance, in such an example, component 185 may comprise a provider edge (PE) router.

As mentioned above, various components of network 105 may comprise virtual network functions (VNFs) which may physically comprise hardware executing computer-readable/computer-executable instructions, code, and/or programs to perform various functions. As illustrated in FIG. 1, units 123 and 124 may reside on a network function virtualization infrastructure (NFVI) 113, which is configurable to perform a broad variety of network functions and services. For example, NFVI 113 may comprise shared hardware, e.g., one or more host devices comprising line cards, central processing units (CPUs), or processors, memories to hold computer-readable/computer-executable instructions, code, and/or programs, and so forth. For instance, in one example unit 123 may be configured to be a firewall, a media server, a Simple Network Management protocol (SNMP) trap, etc., and unit 124 may be configured to be a PE router, e.g., a virtual provide edge (VPE) router, which may provide connectivity to network 105 for endpoint devices 142 and 143. As noted above, these various virtual network functions may be container-based VNFs and/or VM-based VNFs. In one example, NFVI 113 may represent a single computing device. Accordingly, units 123 and 124 may physically reside on the same host device. In another example, NFVI 113 may represent multiple host devices such that units 123 and 124 may reside on different host devices. In one example, unit 123 and/or unit 124 may have functions that are distributed over a plurality of host devices. For instance, unit 123 and/or unit 124 may be instantiated and arranged (e.g., configured/programmed via computer-readable/computer-executable instructions, code, and/or programs) to provide for load balancing between two processors and several line cards that may reside on separate host devices.

In one example, network 105 may also include an additional NFVI 111. For instance, unit 121 may be hosted on NFVI 111, which may comprise host devices having the same or similar physical components as NFVI 113. In addition, NFVI 111 may reside in a same location or in different locations from NFVI 113. As illustrated in FIG. 1, unit 121 may be configured to perform functions of an internal component of network 105. For instance, due to the connections available to NFVI 111, unit 121 may not function as a PE router, a SGW, a MME, a firewall, etc. Instead, unit 121 may be configured to provide functions of components that do not utilize direct connections to components external to network 105, such as a call control element (CCE), a media server, a domain name service (DNS) server, a packet data network gateway (PGW), a gateway mobile switching center (GMSC), a short message service center (SMSC), etc.

Figure 3:
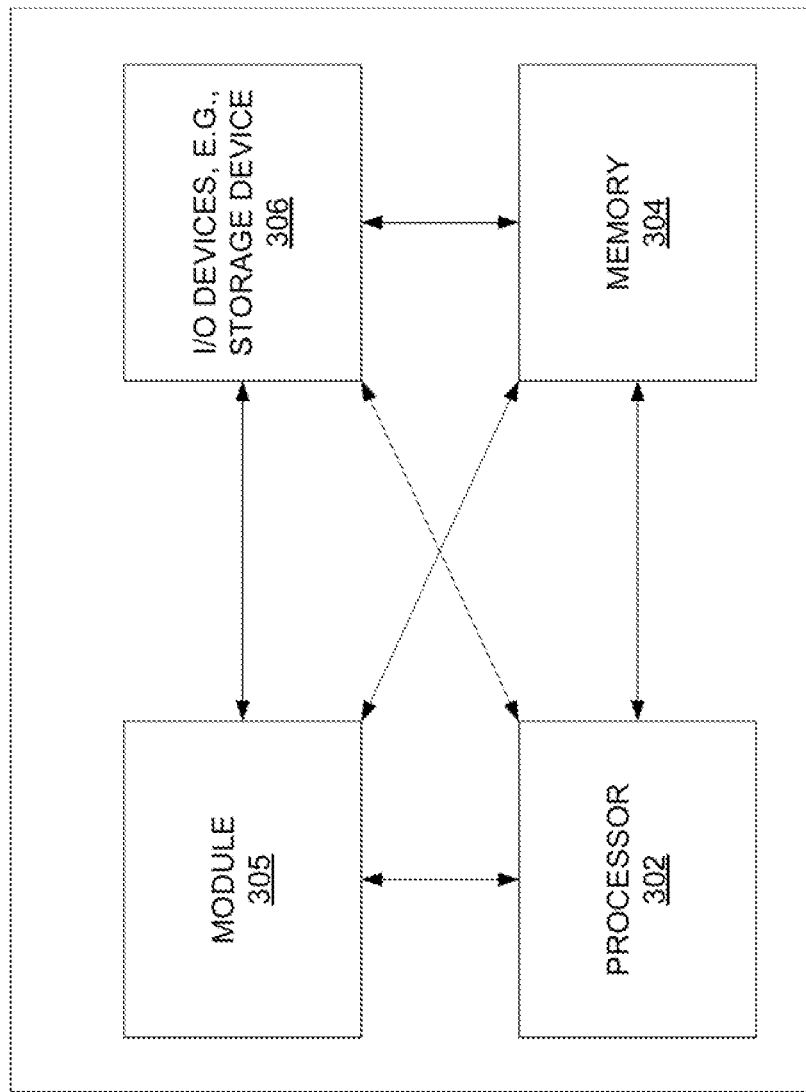
FIG. 3 illustrates a high level block diagram of a computing device specifically programmed to perform the steps, functions, blocks and/or operations described herein.

As further illustrated in FIG. 1, network 105 includes management components 199, which may include agentless validation platform 190 (including several components as described in greater detail below) and a software defined network (SDN) controller 155. In one example, the agentless validation platform 190 (and/or one or more components thereof) and/or SDN controller 155 may comprise a computing system or server, such as computing system 300 depicted in FIG. 3, and may be configured to provide one or more operations or functions in connection with examples of the present disclosure for performing at least one remedial action in a communication network in response to identifying at least one file or at least one directory for which a respective snapshot attribute fails to match a respective one of a plurality of baseline attributes associated with a plurality of representative files. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., a computing system as illustrated in FIG. 3 and discussed below) or multiple computing devices collectively configured to perform various steps, functions, and/or operations in accordance with the present disclosure.

In one example, NFVI 111 and unit 121, and NFVI 113 and units 123 and 124 may be controlled and managed by the SDN controller 155. For instance, in one example, SDN controller 155 is responsible for such functions as provisioning and releasing instantiations of VNFs to perform the functions of routers, switches, and other devices, provisioning routing tables and other operating parameters for the VNFs, and so forth. In one example, SDN controller 155 may maintain communications with VNFs and/or host devices/NFVI via a number of control links 151 which may comprise secure tunnels for signaling communications over an underling IP infrastructure of network 105 (and similarly for agentless validation platform 190). In other words, the control links 151 may comprise virtual links multiplexed with transmission traffic and other data traversing network 105 and carried over a shared set of physical links. For ease of illustration control links associated with some of the components of network 105 are omitted from FIG. 1. In one example, the SDN controller 155 may also comprise a virtual machine operating on NFVI/host device(s), or may comprise a dedicated device. For instance, SDN controller 155 may be collocated with one or more VNFs, or may be deployed in a different host device or at a different physical location.

The functions of SDN controller 155 may include the selection of NFVI from among various NFVI available in network 105 (e.g., NFVI 111 or 113) to host various devices, such as routers, gateways, switches, etc., and the instantiation of such devices. For example, with respect to units 123 and 124, SDN controller 155 may download computer-executable/computer-readable instructions, code, and/or programs (broadly "configuration code") for units 123 and 124 respectively, which when executed by a processor of the NFVI 113, may cause the NFVI 113 to perform as a PE router, a gateway, a route reflector, a SGW, a MME, a firewall, a media server, a DNS server, a PGW, a GMSC, a SMSC, a CCE, and so forth. In one example, SDN controller 155 may download the configuration code to the NFVI 113. In another example, SDN controller 155 may instruct the NFVI 113 to load the configuration code previously stored on NFVI 113 and/or to retrieve the configuration code from another device in network 105 that may store the configuration code for one or more VNFs. The functions of SDN controller 155 may also include releasing or decommissioning unit 123 and/or unit 124 when no longer required, the transferring of the functions of units 123 and/or 124 to different NFVI, e.g., when NVFI 113 is taken offline, and so on.

In addition, in one example, SDN controller 155 may represent a processing system comprising a plurality of controllers, e.g., a multi-layer SDN controller, one or more federated layer 0/physical layer SDN controllers, and so forth. For instance, a multi-layer SDN controller may be responsible for instantiating, tearing down, configuring, reconfiguring, and/or managing layer 2 and/or layer 3 VNFs (e.g., a network switch, a layer 3 switch and/or a router, etc.), whereas one or more layer 0 SDN controllers may be responsible for activating and deactivating optical networking components, for configuring and reconfiguring the optical networking components (e.g., to provide circuits/wavelength connections between various nodes or to be placed in idle mode), for receiving management and configuration information from such devices, for instructing optical devices at various nodes to engage in testing operations in accordance with the present disclosure, and so forth. In one example, the layer 0 SDN controller(s) may in turn be controlled by the multi-layer SDN controller. For instance, each layer 0 SDN controller may be assigned to nodes/optical components within a portion of the network 105. In addition, these various components may be co-located or distributed among a plurality of different dedicated computing devices or shared computing devices (e.g., NFVI) as described herein.

As illustrated in FIG. 1, network 105 may also include internal nodes 131-135, which may comprise various components, such as routers, switches, route reflectors, etc., cellular core network, IMS network, and/or VoIP network components, and so forth. In one example, these internal nodes 131-135 may also comprise VNFs hosted by and operating on additional NFVIs. For instance, as illustrated in FIG. 1, internal nodes 131 and 135 may comprise VNFs residing on additional NFVI (not shown) that are controlled by SDN controller 155 via additional control links. However, at least a portion of the internal nodes 131-135 may comprise dedicated devices or components, e.g., non-SDN reconfigurable devices.

Similarly, network 105 may also include components 181 and 182, e.g., PE routers interfacing with networks 160, and component 185, e.g., a PE router which may interface with endpoint device 142. For instance, in one example, network 105 may be configured such that endpoint device 142 (e.g., a CE router) is dual-homed. In other words, endpoint device 142 may access network 105 via either or both of unit 124 and component 185. As mentioned above, components 183 and 184 may comprise a serving gateway (SGW), a mobility management entity (MME), or the like. However, in another example, components 183 and 184 may also comprise PE routers interfacing with network(s) 170, e.g., for non-cellular network-based communications. In one example, components 181-185 may also comprise VNFs hosted by and operating on additional NFVI. However, in another example, at least a portion of the components 181-185 may comprise dedicated devices or components.

In accordance with the present disclosure, various network elements/devices within the system 100 may comprise "white boxes" with disaggregated hardware and software, and with network operating systems configured to collect, store, and transmit snapshot attributes for the files and directories thereof. This may include unit 121/NFVI 111, units 123 and/or 124/NFVI 113, components 181-185, internal nodes 131-135, etc. In one example, such network elements/network devices may further include functionality to enable network management components (e.g., management components 199 of FIG. 1) to request snapshot attribute collection, storage, and/or transmission according to a schedule or on-demand. For instance, the network operating system(s) of such network devices may include one or more defined APIs to request such snapshot attribute collection, storage, and/or transmission. In addition, as noted above, the NOS API(s) may also enable retrieval of copies of specific files, non-FIM aspects of a network device (e.g., listening service/network ports, running processes, logged in accounts, etc.), and so forth.

As mentioned above, management components 199 may include agentless validation platform 190. In the example of FIG. 1, the agentless validation platform 190 may include a snapshot validation module 192, a file inspection module 194, remediation and alerting system(s) 196, and data storage and archiving systems 198. As also noted above, the agentless validation platform 190 (and/or one or more components thereof) may comprise a processing system configured to provide one or more operations or functions for performing at least one remedial action in a communication network in response to identifying at least one file or at least one directory for which a respective snapshot attribute fails to match a respective one of a plurality of baseline attributes associated with a plurality of representative files (such as described in connection with the example method 200 of FIG. 2, where a "processing system" may comprise a computing device including one or more processors, or cores (or multiple computing devices collectively configured to perform various steps, functions, and/or operations in accordance with the present disclosure)). For instance, the components of agentless validation platform 190 may comprise separate components that collectively operate as a processing system and/or one or more components may be fully or partially instantiated on shared hardware with one or more other components.

In one example, data storage and archiving systems 198 may comprise Structured Query Language (SQL) or no-SQL databases (e.g., MongoDB, or the like) stored in one or more data storage systems comprising a plurality of host devices that may be dedicated to data storage for agentless validation, or which may be shared infrastructure that may host a number of different databases. For instance, the database(s) of data storage and archiving systems 198 may include: (a) baselines (e.g., stored baseline files for each vendor release, patch, and/or update), (b) snapshots (e.g., snapshots received from the devices will be kept for a specified amount of time), (c) analysis reports (e.g., for detected failures/anomalies of verification/compliance checks, as described herein), (d) vulnerable software package versions (e.g., known vulnerable software package versions and properties to be checked for in future analyses), (e) analysis exceptions (e.g., files that are to be excluded from analysis and reporting as well as the reason why such files are excluded), and so forth. In one example, the database(s) may also include a device inventory database. However, in another example, device inventory may rely on other/existing database(s) that may contain the same or similar information. In general, the agentless validation platform 190 may utilize an inventory database describing what network devices are configured in the network 105 (and/or network 160 or network 170). This will enable the agentless validation platform 190 to know what network devices will be generating snapshots. Since there may be several logical networks (e.g., network slices), network zones, etc., in one example, the network device inventory may come from several sources.

In one example, snapshot validation module 192 may obtain baseline attributes associated with a plurality of representative files of a first type of network equipment/device (and similarly for various other types of network equipment). In one example, the baseline attributes may be received from a device and/or NOS vendor (e.g., a "gold baseline"), which may be represented by device 141 in FIG. 1, for example. Alternatively, or in addition, the baseline attributes may be received from one or more sources within network 105 or may be generated by snapshot validation module 192 from snapshots received from one or more monitored network devices/equipment (e.g., a "silver baseline" and/or "bronze baseline"). For instance, the first type of network equipment may be a network equipment type for one or more of unit 121/NFVI 111, units 123 and/or 124/NFVI 113, components 181-185, internal nodes 131-135, etc. In one example, the one or more sets of baseline attributes may be stored in data storage and archiving systems 198.

In this regard, snapshot validation module 192 may further obtain a snapshot (e.g., a set of snapshot attributes) associated with a first plurality of files of a first device of the first type of network equipment (and similarly for other devices of the same type and other device types). In addition, snapshot validation module 192 may identify at least one file or at least one directory for which a respective one of the snapshot attributes fails to match a respective one of the baseline attributes. For instance, snapshot validation module 192 may retrieve one or more sets of baseline attributes from data storage and archiving systems 198 for use in the matching/verification.

In one example, the agentless validation platform 190 may perform at least one remedial action in response to the identifying at least one file or at least one directory for which a respective one of the snapshot attributes fails to match a respective one of the baseline attributes. For instance, remediation and alerting system(s) 196 may include an alert generation system that may use a list of alert recipients to which one or more alerts are to be sent in connection with mismatches detected for particular devices, sets of devices, and or device types. The recipient(s) may include specific network personnel, one or more "roles" or categories of personnel, or one or more other automated systems within the network 105, network 160, and/or network 170, and so forth. Alternatively, or in addition, remediation and alerting system(s) 196 may include logic that associated specified remedial actions with detected mismatches. For instance, snapshot validation module 192 may specifically detect that a file or directory is an old version that has been superseded. As such, remediation and alerting system(s) 196 may implement a remedial action of installing or reinstalling a patch, update, an entire NOS version, etc. on the affected network device.

Similarly, in another example, when snapshot validation module 192 does not isolate the problem to the network device merely having an old software version, remediation and alerting system(s) 196 may disable the affected network device, may reset security aspects of the network device (e.g., logging out all logged in accounts and forcing a re-login if renewed access is desired, changing file ownership/permissions, etc.), and so forth. Depending on the type of network device, remediation and alerting system(s) 196 may alternatively or additionally reroute network traffic away from the network device, may direct outbound traffic to a traffic inspection node, may instantiate other network elements to distribute a traffic load that would otherwise be processed via the affected network element, and so forth. In one example, the remediation and alerting system(s) 196 may communicate with the affected device to provide one or more of these remedial actions, e.g., via instructions/commands to the affected device, and/or with one or more other devices that may be impacted by the reconfiguration (e.g., new or existing nodes that will have new and/or increased traffic as a result of the one or more instructions), and so forth. Alternatively, or in addition, remediation and alerting system(s) 196 may provide one or more remedial actions via request and/or instruction to one or more other components, such as SDN controller 155. For instance, SDN controller 155 may reconfigure one or more upstream network elements or downstream network elements to direct traffic away from an affected node or to cause outbound traffic from an affected network node to be routed to one or more other specified network devices, may instantiate one or more new network elements/devices, may disable the affected network device or may place such device in a "monitor" or "safe" mode, and so forth.

In one example, agentless validation platform 190 may activate file inspection module 194 in response to a detection of a file having a mismatch between snapshot and baseline attributes. In one example, file inspection module 194 may retrieve the identified file from the affected network device, e.g., via one or more APIs. In one example, file inspection module 194 may also retrieve a reference copy of the file, e.g., from a database of data storage and archiving system(s) 198. For instance, file inspection module 194 may perform a line-by-line comparison to detect differences between the file copies/versions, and so forth. It should be noted that in another example, a file inspection component of the system 100 may be external to the agentless validation platform 190. In such case, the file inspection component may be a recipient of an alert generated by the remediation and alerting system(s) 196. It should be noted that agentless validation platform 190 and/or the components thereof may provide various additional functions and/or operations for performing at least one remedial action in a communication network in response to identifying at least one file or at least one directory for which a respective snapshot attribute fails to match a respective one of a plurality of baseline attributes associated with a plurality of representative files, such as described in greater detail below in connection with the example method 200 of FIG. 2.

It should also be noted that the system 100 has been simplified. In other words, the system 100 may be implemented in a different form than that illustrated in FIG. 1. For example, the system 100 may be expanded to include additional networks, such as a network operations center (NOC) network, and additional network elements (not shown) such as border elements, routers, switches, policy servers, security devices, gateways, a content distribution network (CDN) and the like, without altering the scope of the present disclosure. In one example, the system 100 may comprise a plurality of data distribution platforms, such as instances of Apache Kafka, Apache Pulsar, or the like. For instance, the agentless validation platform 190 may obtain snapshot data via one or more "feeds" to which the agentless validation platform 190 may be a subscriber, and where various network devices may publish snapshot data to one or more of such feeds. In addition, system 100 may be altered to omit various elements, substitute elements for devices that perform the same or similar functions and/or combine elements that are illustrated as separate devices. For instance, agentless validation platform 190 may not necessarily have separate components/modules for different functional aspects, but may have integrated functionality for one or more subcomponents, such as snapshot validation module 192 and remediation and alerting system(s) 196. In still another example, SDN controller 155, all or some of the components of agentless validation platform 190, and/or other network elements may comprise functions that are spread across several devices that operate collectively as a SDN controller, an agentless validation platform, a data storage system, etc. Thus, these and other modifications of the system 100 are all contemplated within the scope of the present disclosure.

Figure 2:
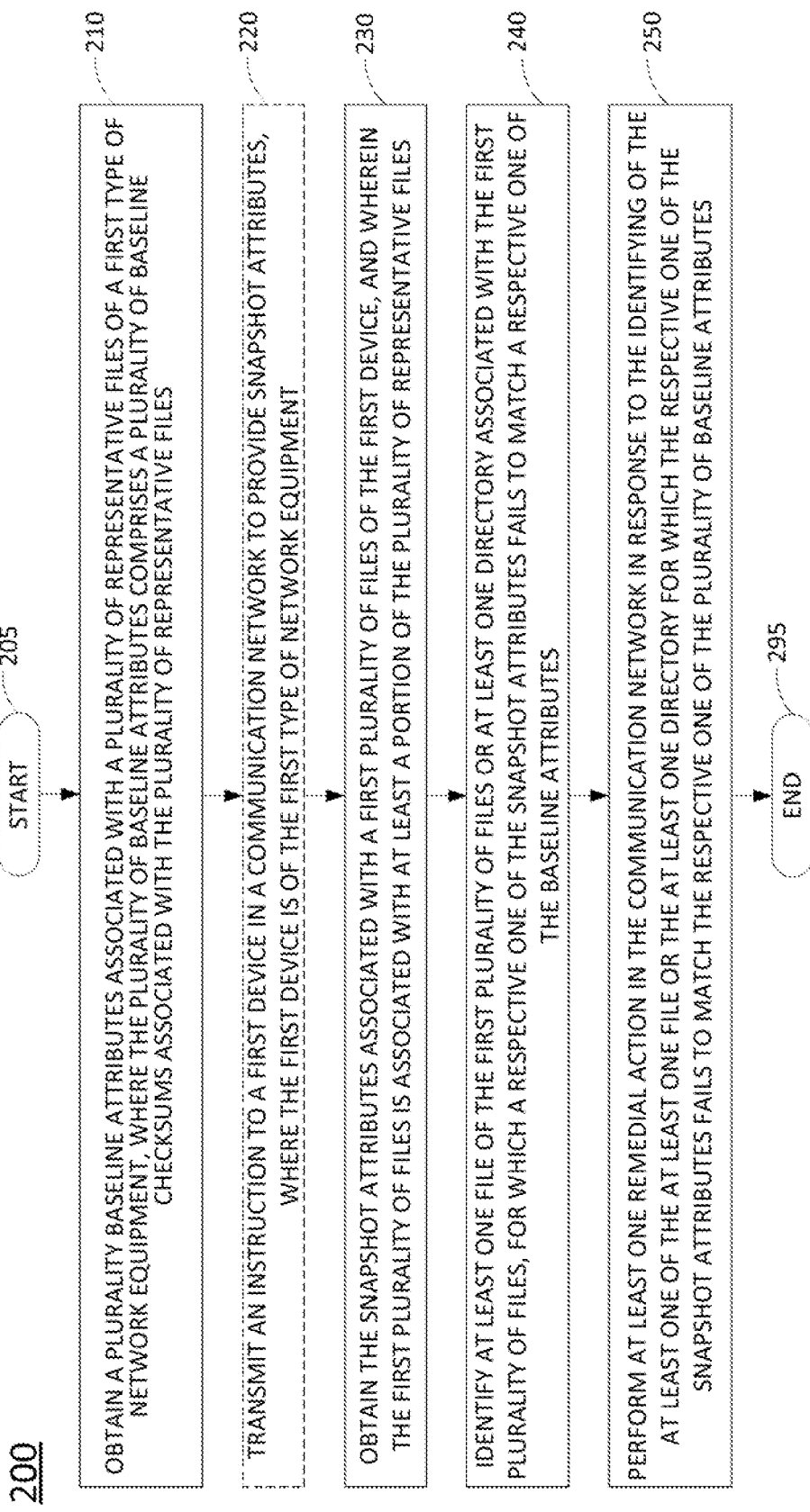
FIG. 2 illustrates a flowchart of an example method for performing at least one remedial action in a communication network in response to identifying at least one file or at least one directory for which a respective snapshot attribute fails to match a respective one of a plurality of baseline attributes associated with a plurality of representative files.

FIG. 2 illustrates a flowchart of an example method 200 for performing at least one remedial action in a communication network in response to identifying at least one file or at least one directory for which a respective snapshot attribute fails to match a respective one of a plurality of baseline attributes associated with a plurality of representative files, in accordance with the present disclosure. In one example, the method 200 is performed by one or more components of a communication network (e.g., one or more components of agentless validation platform 190 and/or management components 199 of FIG. 1), or by one or more components thereof, (e.g., a processor, or processors, performing operations stored in and loaded from a memory), or by an agentless validation platform in conjunction with one or more other components, such as SDN controller 155, VNFs, or other network elements/devices, and so forth. In one example, the steps, functions, or operations of method 200 may be performed by a computing device or system 300, and/or processor 302 as described in connection with FIG. 3 below. For instance, the computing device or system 300 may represent any one or more components of the system 100 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system. The method 200 begins in step 205 and proceeds to step 210.

At step 210, the processing system obtains a plurality of baseline attributes associated with a plurality of representative files of a first type of network equipment, where the plurality of baseline attributes comprises a plurality of baseline checksums associated with the plurality of representative files. For instance, the plurality of baseline attributes may be obtained from at least one of: a vendor of the first device (e.g., a gold baseline) or an instance of the first type of network equipment that is approved by personnel of the communication network (e.g., a silver and/or bronze baseline). For example, the instance of the first type of network equipment may be a model/test network equipment or configuration that is analyzed and approved. In one example, the plurality of baseline attributes may include baseline attributes associated with a plurality of representative directories containing the plurality of representative files. In one example, the plurality of baseline attributes may further include file ownership information, file permission information, file version identifiers, listening ports, open/active ports, directory ownership information, directory permission information, and so forth. In one example, the first type of network equipment comprises a plurality of files types that include: volatile files (e.g., log files, temporary files (e.g., temp files), files in "var" directory in Linux, etc.) and non-volatile files (e.g., executable files or configuration files). The file types can also include unique files. In one example, the representative files may comprise all or a portion of the non-volatile files.

At optional step 220, the processing system may transmit an instruction to a first device deployed in a communication network to provide snapshot attributes, e.g., to begin collecting, to collect based on a schedule, and/or to report on a schedule, etc. For instance, the instruction may be in accordance with one or more API(s) of at least one network operating system of the first device. The first device may be of the first type of network equipment.

At step 230, the processing system obtains snapshot attributes associated with a first plurality of files of the first device, where the first plurality of files is associated with at least a portion of the plurality of representative files. In one example, the obtaining may be in accordance with the instruction that may be transmitted at optional step 220. In one example, the snapshot attributes may be collected by the first device via a background process of at least a first NOS that is operating on the first device. Accordingly, in one example, the snapshot attributes may be obtained from the at least the first NOS of the first device. In one example, snapshot attributes may comprise a plurality of snapshot checksums associated with the first plurality of files (e.g., file checksums and/or directory checksums). In one example, the snapshot attributes may further include file ownership information, file permission information, file version identifiers, listening ports, open/active ports, directory ownership information, directory permission information, and so forth.

At step 240, the processing system identifies at least one of: at least one file of the first plurality of files or at least one directory associated with the first plurality of files, for which a respective one of the snapshot attributes fails to match a respective one of the plurality of baseline attributes. For instance, step 240 may comprise identifying that at least one of the plurality of snapshot checksums fails to match a respective one of the plurality of baseline checksums. In one example, the identifying may comprise detecting that the at least one file comprises a corrupted file (e.g., either inadvertently corrupted, or maliciously corrupted) or an incorrect version of a file, based on the one of the plurality of checksums. For instance, the processing system, and/or a database system accessible thereto, may maintain a set of baseline attributes for old versions, such that when a snapshot checksum for a file fails to match a current baseline, it may then be compared to one or more older baseline snapshots. If there is a match to an old baseline, then it may be determined that the file is not corrupt, but is simply an old version.

As noted above, the plurality of baseline attributes may also include baseline attributes associated with a plurality of representative directories containing the plurality of representative files. As also noted above, in one example, the plurality of baseline attributes may further include file ownership information, file permission information, file version identifiers, listening ports, open/active ports, directory ownership information, directory permission information, and so forth. Accordingly, in one example, step 240 may include detecting that any of such snapshot attributes for the at least one file of the first plurality of files or the at least one directory fails to match one of the above corresponding baseline attributes.

At step 250, the processing system performs at least one remedial action in the communication network in response to the identifying of the at least one of: the at least one file or the at least one directory, for which the respective one of the snapshot attributes fails to match the respective one of the plurality of baseline attributes. In one example, the at least one remedial action may comprise reconfiguring at least one aspect of the communication network associated with the first device. For instance, this may include disabling the first device, performing a full software image reinstall, e.g., wherein the software of the first device is instantiated as a VM on host hardware, replacing the affected file(s), directory, or directories from an SBOM copy, rerouting traffic to one or more other devices of the same device type, configuring the first device to reject traffic on certain ports, suspending all file and/or directory permissions other than one or more designated accounts, forcing a logout of all accounts that are active of the first device, etc. In one example, the at least one remedial action may be to install a correct/updated version of one or more files on the first device (e.g., when there is a match to an old baseline). On the other hand, if the snapshot checksum does not match the corresponding baseline checksum and also fails to match any of the historical baseline checksums for a same file, it may be identified that the file is corrupt. In this case, the remedial action may be to disable the first device, reroute traffic, etc.

In one example, the at least one remedial action may alternatively or additionally include transmitting an alert to at least one recipient computing system indicating the at least one of: the at least one file or the at least one directory, for which the respective one of the snapshot attributes fails to match the respective one of the plurality of baseline attributes. For instance, the alert may be transmitted to personnel or other automated system(s) of the communication network. In one example, step 250 may include obtaining a copy of at least one file that may be identified at step 240. For example, the NOS API(s) of the first device may also provide the ability to request and obtain a full copy of any file on the device. In one example, step 250 may further include performing a detailed file inspection to detect any discrepancies between the retrieved file(s) and one or more reference copies thereof. In one example, additional remedial actions such as described above may be further implemented in response to any such results (e.g., generating an alert/report, automatically reconfiguring one or more aspects of the communication network, etc.).

Following step 250, the method 200 proceeds to step 295 where the method 200 ends.

It should be noted that the example method 200 may be expanded to include additional steps, or may be modified to replace steps with different steps, to combine steps, to omit steps, to perform steps in a different order, and so forth. For instance, in one example the processing system may repeat one or more steps of the method 200, such as steps 220-240 or steps 220-250 for additional snapshots for a same network device, steps 210-240 or steps 210-250 for new NOS and/or software versions for the same network device, and so forth for other network devices of the same or different network device type(s). In one example, step 240 may further include comparing file checksums against checksums for known existing files, e.g., to detect files that are renamed, as well as comparing file checksums to checksums for known malware. In one example, the one or more remedial actions of step 250 may alternatively or additionally address the possibility that malware is detected in this way. In addition, the method 200 may be expanded to include operations of deploying/instantiating new network devices/elements, such as registering such network elements in an inventory database, storing snapshot attributes (e.g., for approval as a new set of bronze attributes), and so forth. In one example, a new configuration can be approved (e.g., in response to an alert transmitted at step 250) and the snapshot attributes can become a new baseline. In one example, personnel may determine that the first device simply failed to receive the update. In another example, the alert can indicate that the file appears to be an old version that has not been updated, and personnel can reconfigure the first device to install the new version of the file and/or to update the old file to the current/correct version. Personnel can also retrieve a file and perform a manual comparison to a baseline or an automated tool may scan the code and highlight any differences. In one example, the method 200 may be expanded or modified to include steps, functions, and/or operations, or other features described above in connection with the example(s) of FIG. 1, or as described elsewhere herein. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 3 depicts a high-level block diagram of a computing system 300 (e.g., a computing device, or processing system) specifically programmed to perform the functions described herein. For example, any one or more components or devices illustrated in FIG. 1 or discussed in connection with the example method of FIG. 2 may be implemented as the computing system 300. As depicted in FIG. 3, the computing system 300 comprises a hardware processor element 302 (e.g., comprising one or more hardware processors, which may include one or more microprocessor(s), one or more central processing units (CPUs), and/or the like, where hardware processor element may also represent one example of a "processing system" as referred to herein), a memory 304, (e.g., random access memory (RAM), read only memory (ROM), a disk drive, an optical drive, a magnetic drive, and/or a Universal Serial Bus (USB) drive), a module 305 for performing at least one remedial action in a communication network in response to identifying at least one file or at least one directory for which a respective snapshot attribute fails to match a respective one of a plurality of baseline attributes associated with a plurality of representative files, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 302 is shown, it should be noted that the computing device may employ a plurality of hardware processor elements. Furthermore, although only one computing device is shown in FIG. 3, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of FIG. 3 is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 302 can also be configured or programmed to cause other devices to perform one or more operations as discussed above. In other words, the hardware processor element 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for performing at least one remedial action in a communication network in response to identifying at least one file or at least one directory for which a respective snapshot attribute fails to match a respective one of a plurality of baseline attributes associated with a plurality of representative files (e.g., a software program comprising computer-executable instructions) can be loaded into memory 304 and executed by hardware processor element 302 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for performing at least one remedial action in a communication network in response to identifying at least one file or at least one directory for which a respective snapshot attribute fails to match a respective one of a plurality of baseline attributes associated with a plurality of representative files (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
obtaining, by a processing system including at least one processor, a plurality of baseline attributes associated with a plurality of representative files of a first type of network equipment, wherein the plurality of baseline attributes comprises a plurality of baseline checksums associated with the plurality of representative files, and wherein the plurality of baseline attributes is obtained from an instance of the first type of network equipment that is approved by personnel of a communication network;
obtaining, by the processing system, snapshot attributes associated with a first plurality of files of a first device deployed in the communication network, wherein the first device is of the first type of network equipment, and wherein the first plurality of files is associated with at least a portion of the plurality of representative files;
identifying, by the processing system, at least one of: at least one file of the first plurality of files or at least one directory associated with the first plurality of files, for which a respective one of the snapshot attributes fails to match a respective one of the plurality of baseline attributes; and
performing, by the processing system, at least one remedial action in the communication network in response to the identifying of the at least one of: the at least one file or the at least one directory for which the respective one of the snapshot attributes fails to match the respective one of the plurality of baseline attributes.

2. The method of claim 1, wherein the snapshot attributes comprise a plurality of snapshot checksums associated with the first plurality of files.

3. The method of claim 2, wherein the identifying comprises identifying that at least one of the plurality of snapshot checksums fails to match a respective one of the plurality of baseline checksums.

4. The method of claim 2, wherein the identifying comprises detecting that the at least one file comprises a corrupted file or an incorrect version of the at least one file, based on at least one of the plurality of snapshot checksums.

5. The method of claim 4, the plurality of snapshot checksums includes at least one snapshot checksum for the incorrect version of the at least one file.

6. The method of claim 1, wherein the at least one remedial action comprises:
reconfiguring at least one aspect of the communication network associated with the first device.

7. The method of claim 1, wherein the at least one remedial action comprises:
transmitting an alert to at least one recipient computing system of the at least one of: the at least one file or the at least one directory for which the respective one of the snapshot attributes fails to match the respective one of the plurality of baseline attributes.

8. The method of claim 1, wherein the plurality of baseline attributes includes baseline attributes associated with a plurality of representative directories containing the plurality of representative files.

9. The method of claim 8, wherein the plurality of baseline attributes further comprises at least one of:
file ownership information;
file permission information;
directory ownership information; or
directory permission information.

10. The method of claim 8, wherein the plurality of baseline attributes further comprises file version identifiers.

11. The method of claim 1, wherein the first type of network equipment comprises a plurality of files types that include: volatile files and non-volatile files.

12. The method of claim 11, wherein the plurality of representative files comprises the non-volatile files.

13. The method of claim 12, wherein the non-volatile files include at least one of:
executable files; or
configuration files.

14. The method of claim 1, wherein the snapshot attributes are obtained from a first network operating system of the first device.

15. The method of claim 14, wherein the first network operating system comprises an application programming interface for obtaining the snapshot attributes.

16. The method of claim 15, wherein the snapshot attributes are collected via a background process of the first network operating system that is operating on the first device.

17. The method of claim 1, further comprising:
transmitting an instruction to the first device to provide the snapshot attributes.

18. The method of claim 1, wherein the plurality of baseline attributes is further obtained from
a vendor of the first device.

19. A non-transitory computer-readable medium storing instructions which, when executed by a processing system including at least one processor, cause the processing system to perform operations, the operations comprising:
obtaining a plurality of baseline attributes associated with a plurality of representative files of a first type of network equipment, wherein the plurality of baseline attributes comprises a plurality of baseline checksums associated with the plurality of representative files, and wherein the plurality of baseline attributes is obtained from an instance of the first type of network equipment that is approved by personnel of a communication network;
obtaining snapshot attributes associated with a first plurality of files of a first device deployed in the communication network, wherein the first device is of the first type of network equipment, and wherein the first plurality of files is associated with at least a portion of the plurality of representative files;
identifying at least one of: at least one file of the first plurality of files or at least one directory associated with the first plurality of files, for which a respective one of the snapshot attributes fails to match a respective one of the plurality of baseline attributes; and
performing at least one remedial action in the communication network in response to the identifying of the at least one of: the at least one file or the at least one directory for which the respective one of the snapshot attributes fails to match the respective one of the plurality of baseline attributes.

20. An apparatus comprising:
a processing system including at least one processor; and
a non-transitory computer-readable medium storing instructions which, when executed by the processing system, cause the processing system to perform operations, the operations comprising:
obtaining a plurality of baseline attributes associated with a plurality of representative files of a first type of network equipment, wherein the plurality of baseline attributes comprises a plurality of baseline checksums associated with the plurality of representative files, and wherein the plurality of baseline attributes is obtained from an instance of the first type of network equipment that is approved by personnel of a communication network;
obtaining snapshot attributes associated with a first plurality of files of a first device deployed in the communication network, wherein the first device is of the first type of network equipment, and wherein the first plurality of files is associated with at least a portion of the plurality of representative files;
identifying at least one of: at least one file of the first plurality of files or at least one directory associated with the first plurality of files, for which a respective one of the snapshot attributes fails to match a respective one of the plurality of baseline attributes; and
performing at least one remedial action in the communication network in response to the identifying of the at least one of: the at least one file or the at least one directory for which the respective one of the snapshot attributes fails to match the respective one of the plurality of baseline attributes.

* * * * *